United States Patent
Minowa

(10) Patent No.: US 10,088,717 B2
(45) Date of Patent: Oct. 2, 2018

(54) LIQUID CRYSTAL DISPLAY WHEREIN A FIRST ELECTRODE OF A SECOND PIXEL IS LOCATED ENTIRELY BELOW A SECOND ELECTRODE THAT EXTENDS ACROSS A FIRST PIXEL TO THE SECOND PIXEL

(71) Applicant: Mitsubishi Electric Corporation, Tokyo (JP)

(72) Inventor: Kenichi Minowa, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/586,461

(22) Filed: May 4, 2017

(65) Prior Publication Data

US 2017/0357133 A1 Dec. 14, 2017

(30) Foreign Application Priority Data

Jun. 8, 2016 (JP) .................... 2016-114256

(51) Int. Cl.
| | | |
|---|---|---|
| *G02F 1/1343* | (2006.01) | |
| *G02F 1/1333* | (2006.01) | |
| *G02F 1/1335* | (2006.01) | |
| *G02F 1/1362* | (2006.01) | |

(52) U.S. Cl.
CPC ...... *G02F 1/134336* (2013.01); *G02F 1/1362* (2013.01); *G02F 1/133345* (2013.01); *G02F 1/133512* (2013.01); *G02F 1/133514* (2013.01); *G02F 2001/134372* (2013.01); *G02F 2201/121* (2013.01); *G02F 2201/123* (2013.01)

(58) Field of Classification Search
CPC .............. G02F 2201/121; G02F 2001/134372
See application file for complete search history.

(56) References Cited

U.S. PATENT DOCUMENTS

| | | | |
|---|---|---|---|
| 7,889,303 B2 | 2/2011 | Onogi et al. | |
| 2006/0290848 A1* | 12/2006 | Choi ................ | G02F 1/133555 349/114 |
| 2008/0013022 A1* | 1/2008 | Ochiai ............... | G02F 1/13306 349/114 |
| 2008/0068523 A1* | 3/2008 | Mitsui .............. | G02F 1/133555 349/37 |
| 2008/0068543 A1* | 3/2008 | Mitsui .............. | G02F 1/134309 349/114 |
| 2008/0225209 A1* | 9/2008 | Higa ................ | G02F 1/133555 349/96 |
| 2008/0291377 A1* | 11/2008 | Sekiguchi ......... | G02F 1/133555 349/114 |
| 2015/0253634 A1* | 9/2015 | Cheng .............. | G02F 1/134309 349/43 |
| 2015/0261047 A1* | 9/2015 | Yamazaki .......... | G02F 1/13439 349/43 |

FOREIGN PATENT DOCUMENTS

| | | |
|---|---|---|
| JP | 2007-264080 A | 10/2007 |
| JP | 2009-092930 A | 4/2009 |

* cited by examiner

*Primary Examiner* — Paul Lee
(74) *Attorney, Agent, or Firm* — Studebaker & Brackett PC

(57) ABSTRACT

A liquid crystal display comprises a first pixel electrode located in a first pixel, a second pixel electrode located in a second pixel, and a common electrode. The common electrode used for displaying a video is located across the first pixel and the second pixel disposed adjacent to each other.

2 Claims, 5 Drawing Sheets

LIQUID CRYSTAL DISPLAY WHEREIN A FIRST ELECTRODE OF A SECOND PIXEL IS LOCATED ENTIRELY BELOW A SECOND ELECTRODE THAT EXTENDS ACROSS A FIRST PIXEL TO THE SECOND PIXEL

BACKGROUND OF THE INVENTION

Field of the Invention

The present invention relates to an active-matrix liquid crystal display.

Description of the Background Art

In recent times, flat panel displays (FPDs), such as liquid crystal displays, having advantages of light weight, low profile, and low power consumption have been used in various pieces of equipment such as televisions, car navigation systems, and computers.

Demand for display quality of liquid crystal displays has been growing every year. Thus, the technique for achieving high contrast and a wide viewing angle has been mainly adopted as the recent technique for driving the liquid crystal display.

Specifically, producers of liquid crystals that adopt the in-plane switching (IPS) as the technique for driving the liquid crystal display are on the increase because of high display quality. However, the IPS liquid crystal display is poor in productivity. Thus, it is absolutely necessary to improve yields of the IPS liquid crystal display.

The conventional IPS liquid crystal display includes two substrates facing each other. The two substrates are maintained at a fixed interval by a spacer. The two substrates include a liquid crystal layer located therebetween. One of the two substrates is a TFT substrate. The other of the two substrates is a counter substrate.

The TFT substrate includes a plurality of thin film transistors and a common electrode. An electric charge stored between a pixel electrode and the common electrode controls the alignment of liquid crystal molecules in the TFT substrate. The common electrode serving as a conductive film is a transparent electrode. The transparent electrode is made of, for example, indium tin oxide (ITO) or indium zinc oxide (IZO).

The counter substrate is a color filter substrate that functions as a color filter. The counter substrate includes a black matrix, a color material layer, an organic film layer, and a columnar spacer. The black matrix is made of a material that does not allow light to pass therethrough. For example, the black matrix is located around a display region for displaying a video. The IPS liquid crystal display does not include the conductive film on the counter substrate in general.

As described above, the IPS liquid crystal display includes the pixel electrode and the common electrode on the TFT substrate. The IPS liquid crystal display generates an electric field in a direction parallel to the main surface of the TFT substrate. Thus, the liquid crystal molecules can be moved in a lateral direction. Consequently, the wide viewing angle is achieved in the IPS liquid crystal display.

An IPS-fringe field switching (FFS) serves as a driving technique that is the more advanced IPS. Hereinafter, the IPS-FFS is simply referred to as "FFS".

The FFS is different from the IPS mainly in that the FFS includes the pixel electrode and the common electrode in different layers. Further, the pixel electrode and the common electrode include an insulating film located therebetween. The FFS liquid crystal display generates an electric field in a horizontal direction parallel to the main surface of the TFT substrate at the time of application of voltage. Consequently, higher contrast and a wider viewing angle are achieved in the FFS liquid crystal display.

Various techniques have been developed for the FFS liquid crystal display. Japanese Patent Application Laid-Open No. 2009-092930 discloses a technique for improving image quality (hereinafter also referred to as a "related art A") in the FFS liquid crystal display. Japanese Patent Application Laid-Open No. 2007-264080 discloses a technique for suppressing crosstalk (hereinafter also referred to as a "related art B") in the FFS liquid crystal display.

However, the related arts A, B have problems below. Specifically, the liquid crystal displays in the related arts A, B have a complicated configuration in which both of the pixel electrode and the common electrode (counter electrode) in two adjacent pixels are formed in different layers. The pixel electrode and the common electrode are used for displaying a video. In other words, the two electrodes used for displaying the video in the two adjacent pixels have the configurations with a high degree of complexity in the related arts A, B.

Thus, the number of steps of manufacturing a liquid crystal display and a manufacturing cost of the liquid crystal display are high in the related arts A, B. To reduce the manufacturing cost of the liquid crystal display, the two electrodes used for displaying the video in the two adjacent pixels need to have the configurations with a lower degree of complexity.

SUMMARY OF THE INVENTION

It is an object of the present invention to provide a liquid crystal display that suppresses a degree of complexity of configurations of two electrodes used for displaying a video in two adjacent pixels.

A liquid crystal display according to one aspect of the present invention includes a display region for displaying a video. The display region includes a plurality of pixels arranged in matrix. The liquid crystal display comprises a first electrode located in each of the plurality of pixels and a second electrode. The first electrode and the second electrode are used for displaying the video. Each of the plurality of pixels is one of a first pixel and a second pixel having different configurations. The first pixel and the second pixel are disposed adjacent to each other. The second electrode is located across the first pixel and the second pixel. The first electrode of the first pixel is located over the second electrode. A first insulating film is provided between the first electrode and the second electrode in the first pixel. The first electrode of the second pixel is located below the second electrode. A second insulating film is provided between the first electrode and the second electrode in the second pixel.

According to the present invention, the second electrode used for displaying the video is located across the first pixel and the second pixel disposed adjacent to each other. In other words, at least the second electrode is formed in the same layer across the first pixel and the second pixel.

Therefore, the liquid crystal display that suppresses the degree of complexity of the configurations of the two electrodes used for displaying the video in the two adjacent pixels can be provided.

These and other objects, features, aspects and advantages of the present invention will become more apparent from the

DESCRIPTION OF THE PREFERRED EMBODIMENT

Figure 1:
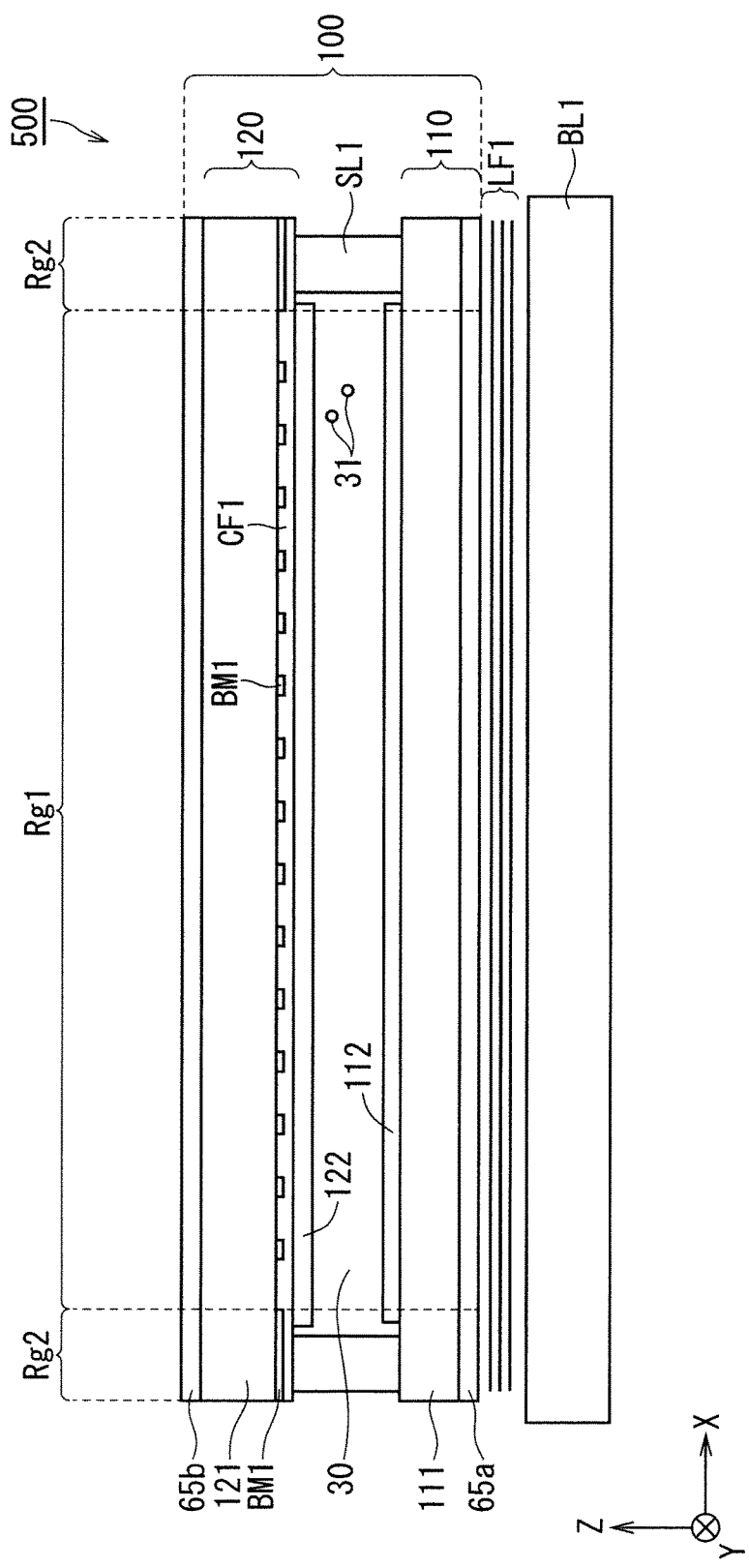
FIG. 1 is a cross-sectional view showing a liquid crystal display according to a first preferred embodiment of the present invention.

A preferred embodiment according to the present invention will be described below with reference to the drawings. In the following drawings, the same components have the same reference numerals. The names and functions of the components denoted by the same reference numerals are also the same. Accordingly, detailed descriptions of some of the components denoted by the same reference numerals will be omitted in some cases.

Dimensions, materials, shapes, and relative positions of the components shown as an example in the preferred embodiment may be changed suitably depending on a structure of an apparatus to which the present invention is applied and various conditions. The dimensions of the components in each drawing may be different from actual dimensions.

First Preferred Embodiment

FIG. 1 is a cross-sectional view showing a liquid crystal display 500 according to a first preferred embodiment of the present invention. The liquid crystal display 500 is an active-matrix liquid crystal display. The liquid crystal display 500 is also an FFS liquid crystal display.

The FFS liquid crystal display, which will be described below in detail, includes an insulating film between a pixel electrode described below and a common electrode described below. In other words, the FFS liquid crystal display has a structure in which the pixel electrode and the common electrode are located in different layers. Thus, the FFS liquid crystal display has advantages below in comparison with the IPS liquid crystal display. The advantages are, for example, high contrast, a wide viewing angle, and a high transmittance.

In FIG. 1, an X direction, a Y direction, and a Z direction are orthogonal to one another. The X direction, the Y direction, and the Z direction in the following drawings are also orthogonal to one another. Hereinafter, a direction including the X direction and a direction (-X direction) opposite to the X direction is also referred to as an "X-axis direction". Hereinafter, a direction including the Y direction and a direction (-Y direction) opposite to the Y direction is also referred to as a "Y-axis direction". Hereinafter, a direction including the Z direction and a direction (-Z direction) opposite to the Z direction is also referred to as a "Z-axis direction".

Hereinafter, a plane including the X-axis direction and the Y-axis direction is also referred to as an "XY plane". Hereinafter, a plane including the X-axis direction and the Z-axis direction is also referred to as an "XZ plane". Hereinafter, a plane including the Y-axis direction and the Z-axis direction is also referred to as a "YZ plane".

Figure 2:
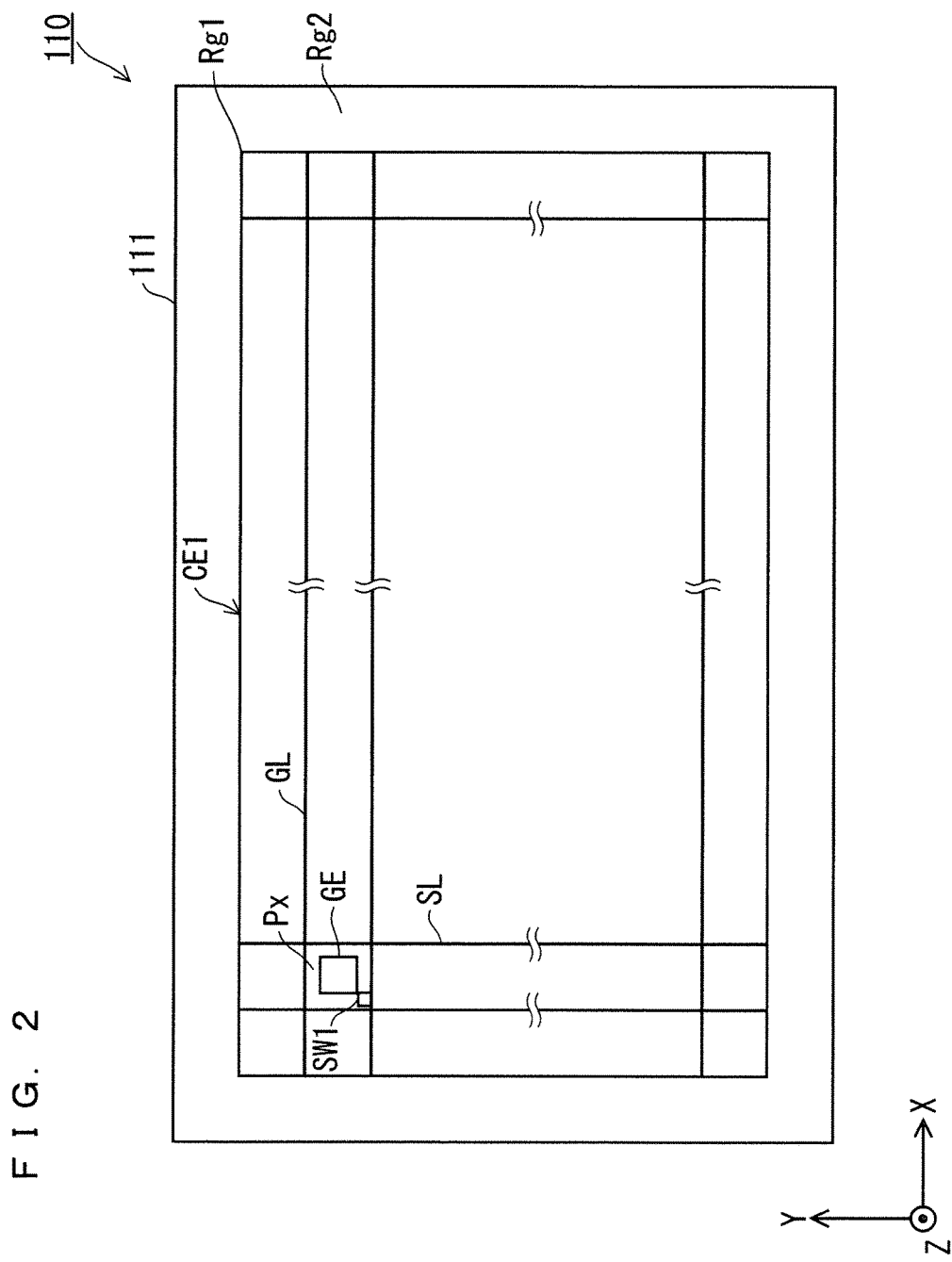
FIG. 2 is a plan view showing a configuration of a below-mentioned substrate included in the liquid crystal display according to the first preferred embodiment of the present invention.

FIG. 2 is a plan view showing a configuration of a below-mentioned substrate 110 included in the liquid crystal display 500 according to the first preferred embodiment of the present invention.

With reference to FIGS. 1 and 2, the liquid crystal display 500 includes a liquid crystal display panel 100, a backlight unit BL1, and an optical film LF1.

The liquid crystal display panel 100 displays a video. The liquid crystal display panel 100 in this preferred embodiment is a FFS liquid crystal display panel 100. Hereinafter, a side of the liquid crystal display panel 100 from which the video is displayed is also referred to as a "visible side". Hereinafter, a side of the liquid crystal display panel 100 from which the video is not displayed is also referred to as a "non-visible side".

The backlight unit BL1 emits light used by the liquid crystal display panel 100 to display the video. The backlight unit BL1 is located on the non-visible side of the liquid crystal display panel 100. The optical film LF1 is located between the liquid crystal display panel 100 and the backlight unit BL1. The optical film LF1 is formed of, for example, a phase difference plate.

Hereinafter, the light emitted from the backlight unit BL1 is also referred to as "light La". The light La is transmitted from the backlight unit BL1 in the Z-axis direction. The liquid crystal display panel 100 uses the light La emitted from the backlight unit BL1 to display the video.

The liquid crystal display 500 further includes a case (not shown). The case is made of, for example, resin or metal. The case of the liquid crystal display 500 accommodates components included in the liquid crystal display 500. Examples of the components include the liquid crystal display panel 100, the backlight unit BL1, and the optical film LF1.

The liquid crystal display panel 100 includes a substrate 110, a substrate 120, and a liquid crystal layer 30. The substrate 110 and the substrate 120 each have translucency. The substrate 110 is an array substrate having a configuration for controlling the liquid crystal layer 30. The substrate 120 is located on the visible side of the liquid crystal display panel 100. The substrate 120 is a color filter substrate from which the light passing through the substrate 120 is emitted as colored light. Examples of the colored light include red light, green light, and blue light.

The substrate 110 and the substrate 120 are bonded to each other with a sealing material SL1. In other words, the liquid crystal display panel 100 has a structure in which the substrate 110 and the substrate 120 are bonded to each other with the sealing material SL1. That is to say, the substrate 120 is a counter substrate facing the substrate 110. The sealing material SL1 has a closed-loop shape in a plan view (XY plane).

The liquid crystal layer 30 includes a plurality of liquid crystal molecules 31. Although FIG. 1 only shows the two liquid crystal molecules 31 to make the configuration easy to see, the liquid crystal layer 30 actually includes extremely many liquid crystal molecules 31. The liquid crystal layer 30 is sealed in a region (space) formed by the substrate 110, the substrate 120, and the sealing material SL1.

The liquid crystal display panel 100 includes a display region Rg1 and a peripheral region Rg2. The display region Rg1 allows the video to be displayed by the liquid crystal display panel 100 (liquid crystal display 500) in the plan view (XY plane). The display region Rg1 includes a plurality of pixels Px arranged in matrix in the plan view (XY plane). The liquid crystal display panel 100 displays the video by using the plurality of pixels Px.

The peripheral region Rg2 is located around the display region Rg1 in the plan view (XY plane). Specifically, the peripheral region Rg2 surrounds the display region Rg1 in the plan view (XY plane). The peripheral region Rg2 has a closed-loop shape in the plan view (XY plane).

In addition, the display region Rg1 and the peripheral region Rg2 are also applied to the space in which the liquid crystal display panel 100 is formed and to the XY plane, the XZ plane, and the YZ plane in the space, similarly to the liquid crystal display panel 100.

In other words, the display region Rg1 and the peripheral region Rg2 are also applied to each of the components (such as the substrate 110, the substrate 120, and the liquid crystal layer 30) forming the liquid crystal display panel 100, similarly to the liquid crystal display panel 100. Thus, as shown in FIGS. 1 and 2, for example, the substrate 110 of the liquid crystal display panel 100 includes the display region Rg1 and the peripheral region Rg2.

Next, the substrate 110 serving as the array substrate is described in detail. With reference to FIGS. 1 and 2, the substrate 110 includes a plurality of gate lines GL, a plurality of source lines SL, a transparent substrate 111, a plurality of switching elements SW1, a plurality of pixel electrodes GE, a common electrode CE1, a plurality of common lines CL (not shown), a polarizing plate 65a, and an alignment film 112.

FIG. 2 shows the three gate lines GL and the three source lines SL to make the configuration easy to see. However, the substrate 110 actually includes n (integer greater than or equal to four) gate lines GL and s (integer greater than or equal to four) source lines SL.

Each of the gate line GL, the source line SL, and the common line CL is made of metal. Each of the gate line GL, the source line SL, and the common line CL has a thin-film shape.

Each of the gate lines GL and each of the source lines SL, which will be described below in detail, transmits a signal for controlling each of the switching elements SW1 described below to each of the switching elements SW1. Each of the switching elements SW1 uses the signal to supply a voltage to the pixel electrode GE.

The n gate lines GL are located in parallel in the display region Rg1. Specifically, as shown in FIG. 2, the n gate lines GL are located on the substrate 110 so as to extend in a row direction (X-axis direction) in the display region Rg1 of the substrate 110. The plurality of common lines CL (not shown) are also located on the substrate 110 so as to extend in the row direction (X-axis direction) in the display region Rg1 of the substrate 110.

The s source lines SL are located in parallel in the display region Rg1. Specifically, as shown in FIG. 2, the s source lines SL are located on the substrate 110 so as to extend in a column direction (Y-axis direction) in the display region Rg1.

A rectangle formed by the plurality of gate lines GL and the plurality of source lines SL corresponds to the "pixel Px".

The switching element SW1 is located in each of the pixels Px forming the display region Rg1 of the substrate 110. In other words, the switching elements SW1 are arranged in matrix. Specifically, the switching element SW1 is located close to a portion where each of the gate lines GL and each of the source lines SL intersect each other.

The polarizing plate 65a has a transmission axis and an absorption axis orthogonal to each other. The polarizing plate 65a absorbs light that vibrates along the absorption axis. In other words, the polarizing plate 65a does not allow passage of light that vibrates along the absorption axis of the polarizing plate 65a.

The transparent substrate 111 has translucency. The transparent substrate 111 is formed of an insulating material. The transparent substrate 111 is, for example, a glass substrate.

The plurality of switching elements SW1 are located on one surface of the transparent substrate 111. In addition, the polarizing plate 65a described above is located on the other surface of the transparent substrate 111.

Each of the switching elements SW1 is, for example, a thin film transistor (TFT) made of amorphous silicon or oxide semiconductor. Specifically, each of the switching elements SW1 is, for example, an N-channel metal-oxide-semiconductor field-effect transistor (MOSFET). Each of the switching elements SW1 may be a P-channel MOSFET.

The pixel electrode GE is connected to each of the switching elements SW1. Specifically, the pixel electrode GE is connected to a drain electrode of each of the switching elements SW1.

The pixel electrode GE is located in each of the pixels Px forming the display region Rg1. Each of the pixel electrodes GE generates an electric field in the liquid crystal layer 30 by application of voltage to the pixel electrode GE. Specifically, each of the pixel electrodes GE is used to generate the electric field to change the alignment of the liquid crystal molecules 31 in the liquid crystal layer 30. The pixel electrode GE has a flat plate shape.

The common electrode CE1 is located in the entire display region Rg1. In other words, the common electrode CE1 is located across the plurality of pixels Px. The common electrode CE1 has a slit SLt described below.

The slit SLt generates a fringe electric field between the common electrode CE1 and the pixel electrode GE. The common electrode CE1 has an opening H1 described below. Each of the pixel electrode GE and the common electrode CE1 is a transparent electrode. The transparent electrode is made of, for example, ITO or IZO.

The alignment film 112 aligns the liquid crystal molecules 31. The alignment film 112 is located on one surface of the transparent substrate 111. The alignment film 112 corresponds to the surface of the substrate 110.

The liquid crystal display 500 (liquid crystal display panel 100) uses the pixel electrode GE and the common electrode CE1 to display the video. In other words, the pixel electrode GE and the common electrode CE1 are used for displaying the video.

Specifically, the liquid crystal display 500 (liquid crystal display panel 100) applies a voltage between the pixel electrode GE and the common electrode CE1. At this time, an electric charge is stored between the pixel electrode GE and the common electrode CE1. This results in the fringe electric field generated between the pixel electrode GE and the common electrode CE1. The generation of the fringe electric field changes the alignment of the liquid crystal molecules 31. In other words, the electric charge stored between the pixel electrode GE and the common electrode CE1 changes the alignment of the liquid crystal molecules 31.

The change in the alignment of the liquid crystal molecules 31 drives the liquid crystal layer 30. In this manner, the liquid crystal display 500 (liquid crystal display panel 100) drives the liquid crystal layer 30 to display the video.

Next, the substrate 120 serving as the color filter substrate is described in detail. With reference to FIG. 1, the substrate 120 includes a polarizing plate 65*b*, a transparent substrate 121, a color filter CF1, a black matrix BM1, and an alignment film 122.

The polarizing plate 65*b* has the same functions and the same configuration as those of the polarizing plate 65*a*. The transparent substrate 121 has translucency. The color filter CF1 and the black matrix BM1 are located on one surface of the transparent substrate 121. In addition, the polarizing plate 65*b* is located on the other surface of the transparent substrate 121.

The black matrix BM1 is a light-shielding member that shields part of light. The black matrix BM1 is located in the peripheral region Rg2 not to allow the light to pass through the peripheral region Rg2 of the substrate 120. The alignment film 122 aligns the liquid crystal molecules 31.

Figure 3:
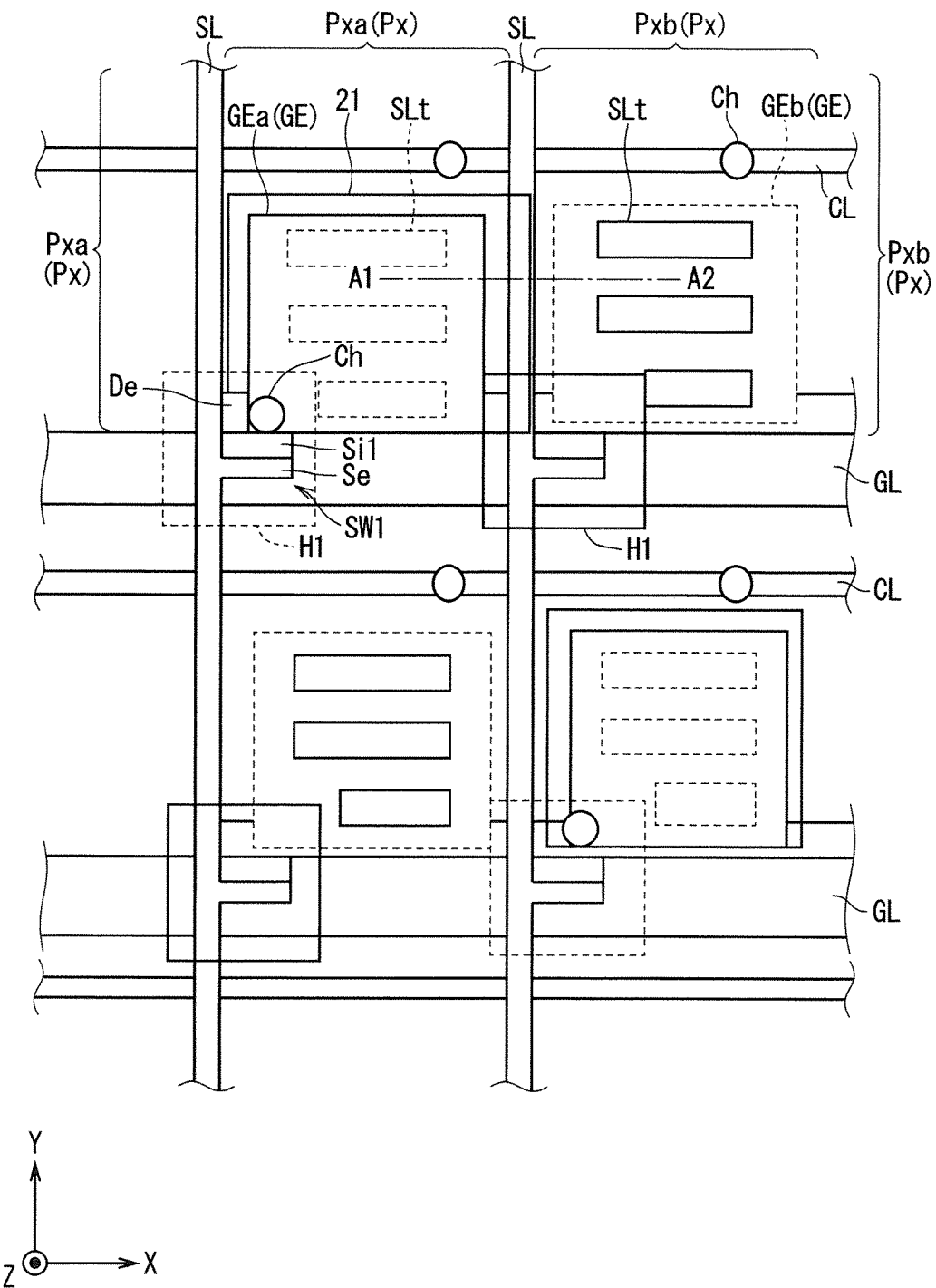
FIG. 3 is a plan view showing a configuration of some pixels in a display region of the substrate according to the first preferred embodiment of the present invention.

Next, a detailed configuration of the display region Rg1 of the substrate 110 of the liquid crystal display panel 100 included in the liquid crystal display 500 according to the first preferred embodiment is described. FIG. 3 is a plan view showing a configuration of some pixels in the display region Rg1 of the substrate 110 according to the first preferred embodiment of the present invention. FIG. 3 does not show the alignment film 112 and an insulating film 22 described below to make the configuration easy to see.

The common electrode CE1 is a transparent electrode and is located in the entire display region Rg1. Thus, FIG. 1 does not show the contour of the common electrode CE1. FIG. 3 shows the slit SLt and the opening H1 of the common electrode CE1.

With reference to FIG. 3, the switching element SW1 is located in a region that overlaps the gate line GL in the plan view (XY plane). The switching element SW1 includes part of the gate line GL, a source electrode Se, a drain electrode De, and silicon Si1. The source line SL has a part that extends in the X direction at the intersection of the source line SL and the gate line GL. The part of the source line SL that extends in the X direction is the source electrode Se.

The common electrode CE1 (not shown) is electrically connected to the plurality of common lines CL through a contact hole Ch.

(Characteristic Configuration)

Next, a characteristic configuration of this preferred embodiment is described. The pixels of two kinds having different configurations are used in this preferred embodiment. Hereinafter, one of the pixels of the two kinds having the different configurations is also referred to as a "pixel Pxa". Hereinafter, the other of the pixels of the two kinds having the different configurations is also referred to as a "pixel Pxb". Each of the pixels Px forming the display region Rg1 is one of the pixel Pxa and the pixel Pxb having the different configurations.

Figure 4:
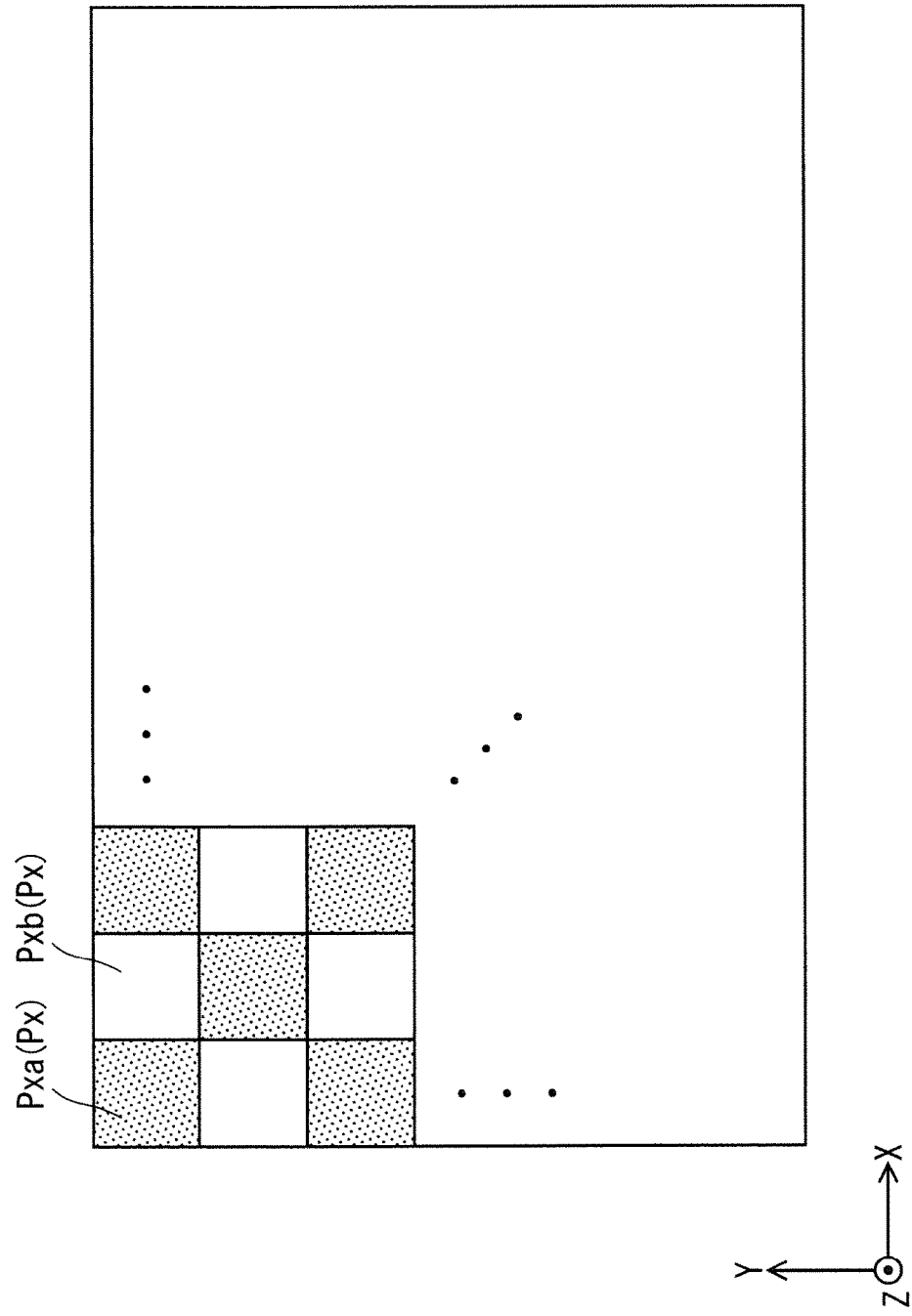
FIG. 4 is a plan view showing an example of arrangement of pixels of two kinds in the first preferred embodiment of the present invention.

FIG. 4 is a plan view showing an example of arrangement of the pixels Pxa, Pxb in the first preferred embodiment of the present invention. With reference to FIG. 4, the pixels Pxa, Pxb are disposed in the display region Rg1 so as to form a grid pattern (checker pattern). In other words, the pixel Pxa and the pixel Pxb are disposed adjacent to each other.

As described above, the common electrode CE1 is located across the plurality of pixels Px. Thus, the common electrode CE1 is located across the pixel Pxa and the pixel Pxb.

Hereinafter, the direction (X-axis direction) in which the gate line GL extends is also referred to as a "direction DR1". Hereinafter, the direction (Y-axis direction) in which the source line SL extends is also referred to as a "direction DR2".

A direction along the plane forming the display region Rg1 in the plan view (XY plane) includes the direction DR1 and the direction DR2 orthogonal to each other. The plane forming the display region Rg1 in the plan view (XY plane) is the plane forming the display region Rg1 in FIG. 2. In other words, the plane forming the display region Rg1 in the plan view (XY plane) is the plane parallel to the main surface of the transparent substrate 111.

The pixel Pxa and the pixel Pxb are alternately disposed in a direction along the direction DR1. The pixel Pxa and the pixel Pxb are alternately disposed in a direction along the direction DR2.

Hereinafter, the pixel electrode GE included in the pixel Pxa is also referred to as a "pixel electrode GEa". Hereinafter, the pixel electrode GE included in the pixel Pxb is also referred to as a "pixel electrode GEb".

Figure 5:
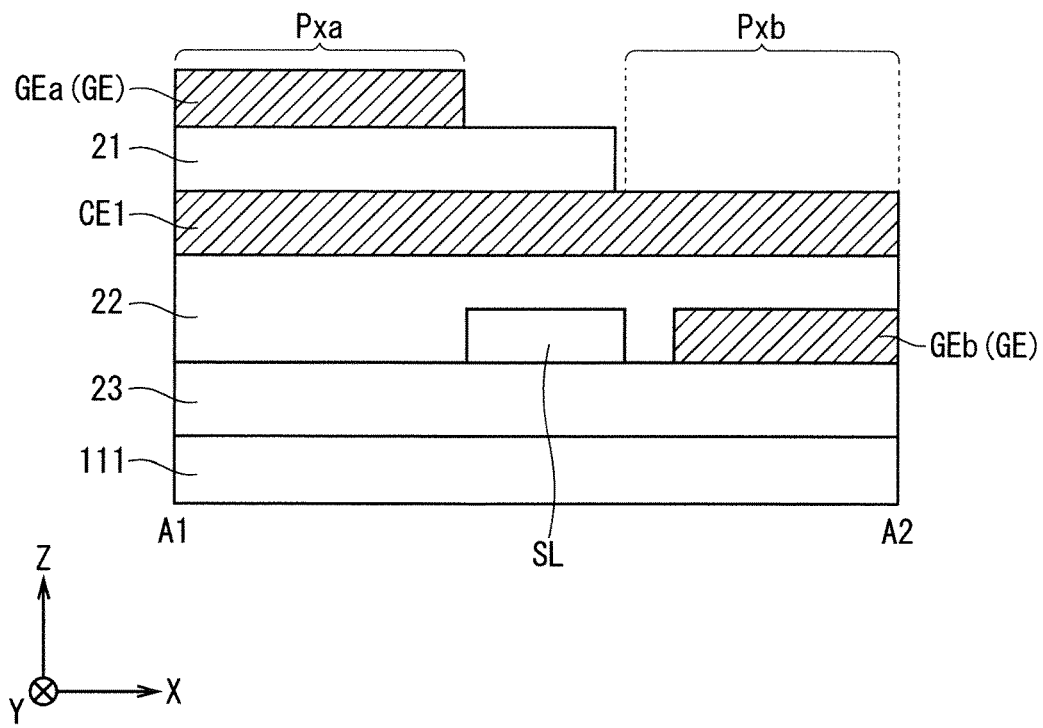
FIG. 5 is a cross-sectional view of a liquid crystal display panel taken along an A1-A2 line in FIG. 3.

Next, the pixels Pxa, Pxb are described. FIG. 5 is a cross-sectional view of the liquid crystal display panel 100 taken along an A1-A2 line in FIG. 3. FIG. 5 does not show the alignment film 112 actually located over the pixel Pxa and the pixel Pxb to make the configuration easy to see.

With reference to FIGS. 3 and 5, the liquid crystal display panel 100 (liquid crystal display 500) further includes an insulating film 21, an insulating film 22, and an insulating film 23. Each of the insulating films 21, 22, 23 is, for example, a SiN film (silicon nitride film) or an organic film.

The insulating film 23 is located on the transparent substrate 111. The source line SL, the pixel electrode GEb, the silicon Si1 (not shown), and the drain electrode De (not shown) are located on the insulating film 23.

The insulating film 22 is located so as to cover the source line SL, the pixel electrode GEb, part of the insulating film 23, the silicon Si1 (not shown), and the drain electrode De (not shown). The pixel electrode GEb and the source line SL are insulated from each other by the insulating film 22. The pixel electrode GEb and the source line SL are located in the same layer.

The common electrode CE1 is located on the insulating film 22. As described above, the common electrode CE1 is located across the pixel Pxa and the pixel Pxb. The insulating film 21 is located on part of the common electrode CE1. The pixel electrode GEa is located on the insulating film 21.

Next, detailed configurations of the pixel Pxa and the pixel Pxb are described. First, the configuration of the pixel Pxa is described. The pixel electrode GEa of the pixel Pxa is located over the common electrode CE1. The insulating film 21 is provided between the pixel electrode GEa and the common electrode CE1 in the pixel Pxa.

Specifically, the insulating film 22 is located on the insulating film 23 in the pixel Pxa. The common electrode CE1 is located on the insulating film 22 in the pixel Pxa. The insulating film 21 is located on the common electrode CE1 in the pixel Pxa. The insulating film 21 is located on the part of the common electrode CE1 such that the pixel electrode GEa of the pixel Pxa does not contact the pixel electrode GEb of the pixel Pxb.

The pixel electrode GEa is located on the insulating film 21 in the pixel Pxa. The pixel electrode GEa is electrically connected to the drain electrode De (not shown) through the contact hole Ch.

Next, the configuration of the pixel Pxb is described. The pixel electrode GEb of the pixel Pxb is located below the common electrode CE1. The insulating film 22 is provided between the pixel electrode GEb and the common electrode CE1 in the pixel Pxb.

Specifically, the pixel electrode GEb is located on the insulating film 23 in the pixel Pxb. The insulating film 22 is located so as to cover the part of the insulating film 23 and the pixel electrode GEb in the pixel Pxb. The common electrode CE1 is located on the insulating film 22 in the pixel Pxb. The pixel electrode GEb is electrically connected directly to the drain electrode De (not shown).

Next, a manufacturing method for forming the pixel Pxa and the pixel Pxb is simply described. The pixel Pxa and the pixel Pxb are formed with the use of a photolithographic technique.

First, a gate layer including the gate line GL and the common line CL is formed on the transparent substrate 111. Next, the insulating film 23 is formed so as to cover the gate layer. Specifically, the insulating film 23 is formed so as to cover part of the transparent substrate 111, the gate line GL, and the common line CL.

A silicon layer including the silicon Si1 is then formed on the insulating film 23. A source layer including the source line SL and the drain electrode De is then formed in a region of the surface of the insulating film 23 in which the silicon Si1 is not located. The pixel electrode GEb is then formed in a region of the surface of the insulating film 23 in which the silicon Si1, the source line SL, and the drain electrode De are not located.

The insulating film 22 is then formed so as to cover the part of the insulating film 23, the source line SL, the pixel electrode GEb, the silicon Si1, and the drain electrode De. The common electrode CE1 is then formed on the insulating film 22. The insulating film 21 is then formed on the part of the surface of the common electrode CE1. The pixel electrode GEa is then formed on the insulating film 21.

A planarizing film is located so as to cover the pixel electrode GEa, part of the insulating film 21, and part of the common electrode CE1 as necessary. The alignment film 112 is formed on the planarizing film. In this manner above, the pixel Pxa and the pixel Pxb are formed.

As described above, the common electrode CE1 used for displaying the video is located across the pixel Pxa and the pixel Pxb disposed adjacent to each other in this preferred embodiment. In other words, at least the common electrode CE1 is formed in the same layer across the pixel Pxa and the pixel Pxb.

Therefore, the liquid crystal display that suppresses the degree of complexity of the configurations of the two electrodes used for displaying the video in the two adjacent pixels can be provided.

As described above, the pixel electrode and the common electrode are located in the different layers in the FFS liquid crystal display. Thus, the FFS liquid crystal display needs many array masks used for pattern formation, resulting in disadvantages such as a high cost.

Then, a configuration in which the two adjacent pixel electrodes are formed in the same layer may be conceivable as the configuration of the conventional FFS liquid crystal display.

Hereinafter, the configuration in which the two adjacent pixel electrodes are formed in the same layer is also referred to as a "configuration CtN". Hereinafter, the FFS liquid crystal display having the configuration CtN is referred to as a "liquid crystal display 500N". The liquid crystal display 500N is a comparative example of the liquid crystal display 500.

Figure 6:
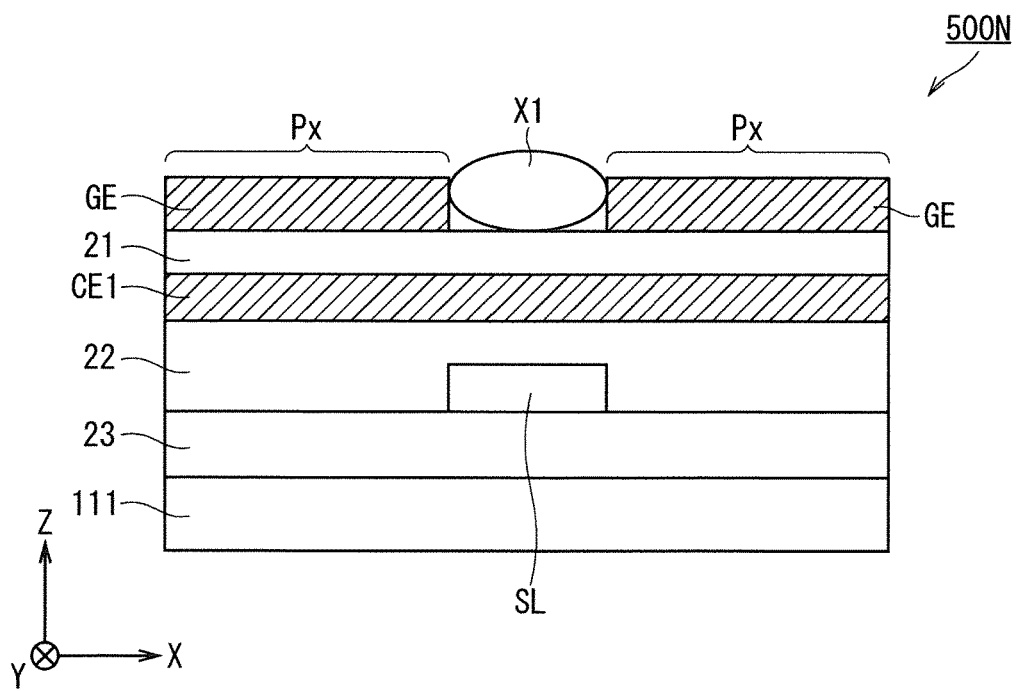
FIG. 6 is a diagram showing a configuration CtN of a liquid crystal display as a comparative example.

FIG. 6 is a diagram showing the configuration CtN of the liquid crystal display 500N as the comparative example. With reference to FIG. 6, two adjacent pixel electrodes GE are formed in the same layer in two adjacent pixels Px.

Although the pixel electrode GE is located over the common electrode CE1 in the configuration CtN shown in FIG. 6, the configuration CtN is not limited to this configuration. The pixel electrode GE may be located below the common electrode CE1 in the configuration CtN.

When the pixel electrode GE is formed with a conductive film, a scrap of the conductive film may be generated as a conductive foreign matter X1 in the configuration CtN. As shown in FIG. 6, a situation (hereinafter also referred to as a "situation Stx") where the conductive foreign matter X1 is located across the two adjacent pixels Px may occur.

In the situation Stx, the pixel electrode GE of the one pixel Px and the pixel electrode GE of the other pixel Px are short-circuited in the two adjacent pixels Px. Thus, when the liquid crystal display 500N displays a video in the situation Stx, a point defect (dot-shaped display defect) is recognized.

The point defect includes a black point detect and a light point defect. The light point defect is more prominent than the black point defect. The light point defect includes a single light point defect and a continuous light point defect having a plurality of light point defects connected to each other. The continuous light point defect is more prominent than the single light point defect.

When the situation Stx occurs in the FFS liquid crystal display 500N, the continuous light point defect is recognized. Thus, the occurrence of the situation Stx in the liquid crystal display 500N as the comparative example causes a display failure and a decrease in quality of the video, for example. For this reason, the liquid crystal display 500N has low yields of the liquid crystal display.

For the occurrence of the situation Stx, a technique for performing a repair step of removing the conductive foreign matter X1 with laser light is conceivable. However, the technique needs an investment in equipment for finding defects and repair devices. Further, the technique needs to add the repair step to the normal steps of manufacturing a liquid crystal display. Thus, the technique needs a high manufacturing cost of the liquid crystal display.

Accordingly, the liquid crystal display 500 (liquid crystal display panel 100) in this preferred embodiment is configured as described above, so that the liquid crystal display 500 can solve the above-mentioned problems of the liquid crystal display 500N. Specifically, the pixel electrode GEa and the pixel electrode GEb are located in the different layers in the pixel Pxa and the pixel Pxb adjacent to each other, as shown in FIG. 5, in the liquid crystal display 500.

Herein, it is assumed that a situation (hereinafter also referred to as a "situation Stxa") where the conductive foreign matter X1 is located across the pixel Pxa and the pixel Pxb occurs. Even if the situation Stxa occurs, the pixel electrode GEa and the pixel electrode GEb are not short-circuited in the liquid crystal display 500.

Thus, even in the situation where the situation Stxa occurs, the continuous light point defect does not occur in the liquid crystal display 500. If the situation Stxa occurs, the pixel electrode GEa and the common electrode CE1 are short-circuited to cause only the black point defect, which is less likely to be prominent, in the liquid crystal display 500.

If the situation Stxa occurs, the repair step described above does not need to be performed. Thus, the manufacturing cost of the liquid crystal display does not increase in the configuration of this preferred embodiment. A decrease in the yields of the liquid crystal display can be prevented in the configuration of this preferred embodiment.

In addition, according to the present invention, the preferred embodiment can be appropriately varied or omitted within the scope of the invention.

For example, it is assumed that the common electrode CE1 is located across all the pixels Px forming the display region Rg1, but this is not restrictive. For example, the common electrode CE1 may be located across at least two adjacent pixels Px. In such a configuration, the liquid crystal display 500 includes a plurality of common electrodes CE1.

It is assumed that the pixel Pxa and the pixel Pxb are alternately disposed in the direction along each of the directions DR1, DR2, but this is not restrictive.

For example, the pixel Pxa and the pixel Pxb may be alternately disposed in the direction along only the direction DR1. In such a configuration, the pixel Pxa and the pixel Pxb may not be alternately disposed in the direction DR2.

The pixel Pxa and the pixel Pxb may be alternately disposed in the direction along only the direction DR2. In such a configuration, the pixel Pxa and the pixel Pxb may not be alternately disposed in the direction DR1.

The pixel Pxa and the pixel Pxb may not be alternately disposed from one end of the display region Rg1 to the other end of the display region Rg1. For example, the pixel Pxa and the pixel Pxb may be alternately disposed for only four pixels in the direction DR1.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display that includes a display region for displaying a video, wherein
   said display region includes a plurality of pixels arranged in matrix,
   said liquid crystal display comprises
      a first electrode located in each of said plurality of pixels, and
      a second electrode,
   said first electrode and said second electrode are used for displaying said video,
   each of said plurality of pixels is one of a first pixel and a second pixel having different configurations,
   said first pixel and said second pixel are disposed adjacent to each other,
   said second electrode in its entirety is located in a same layer across said first pixel and said second pixel,
   said first electrode of said first pixel is located over said second electrode,
   a first insulating film is provided between said first electrode and said second electrode in said first pixel,
   said first electrode of said second pixel in its entirety is located below said second electrode, and
   a second insulating film is provided between said first electrode and said second electrode in said second pixel.

2. The liquid crystal display according to claim 1, wherein
   a direction along a plane forming said display region in a plan view includes a first direction and a second direction orthogonal to each other,
   said first pixel and said second pixel are alternately disposed in a direction along said first direction, and
   said first pixel and said second pixel are further alternately disposed in a direction along said second direction.

* * * * *